US012793442B1

(12) United States Patent
Stolzenfeld

(10) Patent No.: US 12,793,442 B1
(45) Date of Patent: Nov. 10, 2026

(54) LANE BOUNDARY GENERATION

(71) Applicant: Zoox, Inc., Foster City, CA (US)

(72) Inventor: Timothy Robert Stolzenfeld, Boston, MA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 19/205,034

(22) Filed: May 12, 2025

(51) Int. Cl.
*G06V 20/56* (2022.01)
*G01C 21/36* (2006.01)
*G06T 7/13* (2017.01)

(52) U.S. Cl.
CPC ....... *G06V 20/588* (2022.01); *G01C 21/3658* (2013.01); *G06T 7/13* (2017.01)

(58) Field of Classification Search
CPC ..... G06V 20/588; G06T 7/13; G01C 21/3658
See application file for complete search history.

(56) References Cited

U.S. PATENT DOCUMENTS 10,649,459 B2 5/2020 Wang et al.
2022/0230017 A1* 7/2022 Niesen .................... G06F 18/22
2024/0110808 A1* 4/2024 Kunze ................ G01C 21/3658
2025/0087093 A1* 3/2025 Zhang ..................... G08G 1/167
2025/0277664 A1* 9/2025 Chugh ............... G01C 21/3819
2025/0391181 A1* 12/2025 Schaefer .............. G06V 20/588

* cited by examiner

*Primary Examiner* — Sunghyoun Park
(74) *Attorney, Agent, or Firm* — Lee & Hayes, P.C.

(57) ABSTRACT

Techniques for generating accurate lane boundary representations in map data are described herein. A map management component may receive image data of an environment and input such image data into a machine-learned model trained to detect and/or output representations of lane boundaries. Additionally, the map management component may generate a set of reference lines that represent the road network of the environment. Based on receiving the lane boundaries from the machine-learned model, the map management component may assign (or associate) lane boundaries to the reference lines. For the lane boundaries associated with a reference line, the map management component fuse (or refine) the lane boundaries such that there is a single lane boundary corresponding to a single real-world lane boundary. The map management component may cause the single lane boundary to be stored within map data and transmit the map data to a real-world vehicle.

20 Claims, 7 Drawing Sheets

300

500

LANE BOUNDARY GENERATION

BACKGROUND

Vehicles, such as autonomous vehicles, may navigate along designated routes. In some examples, the vehicle may use a map to assist in detecting and/or classifying objects as well as in generating actions for the vehicle to follow. However, in some circumstances, techniques for generating the map may result in inaccurate and/or suboptimal results.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
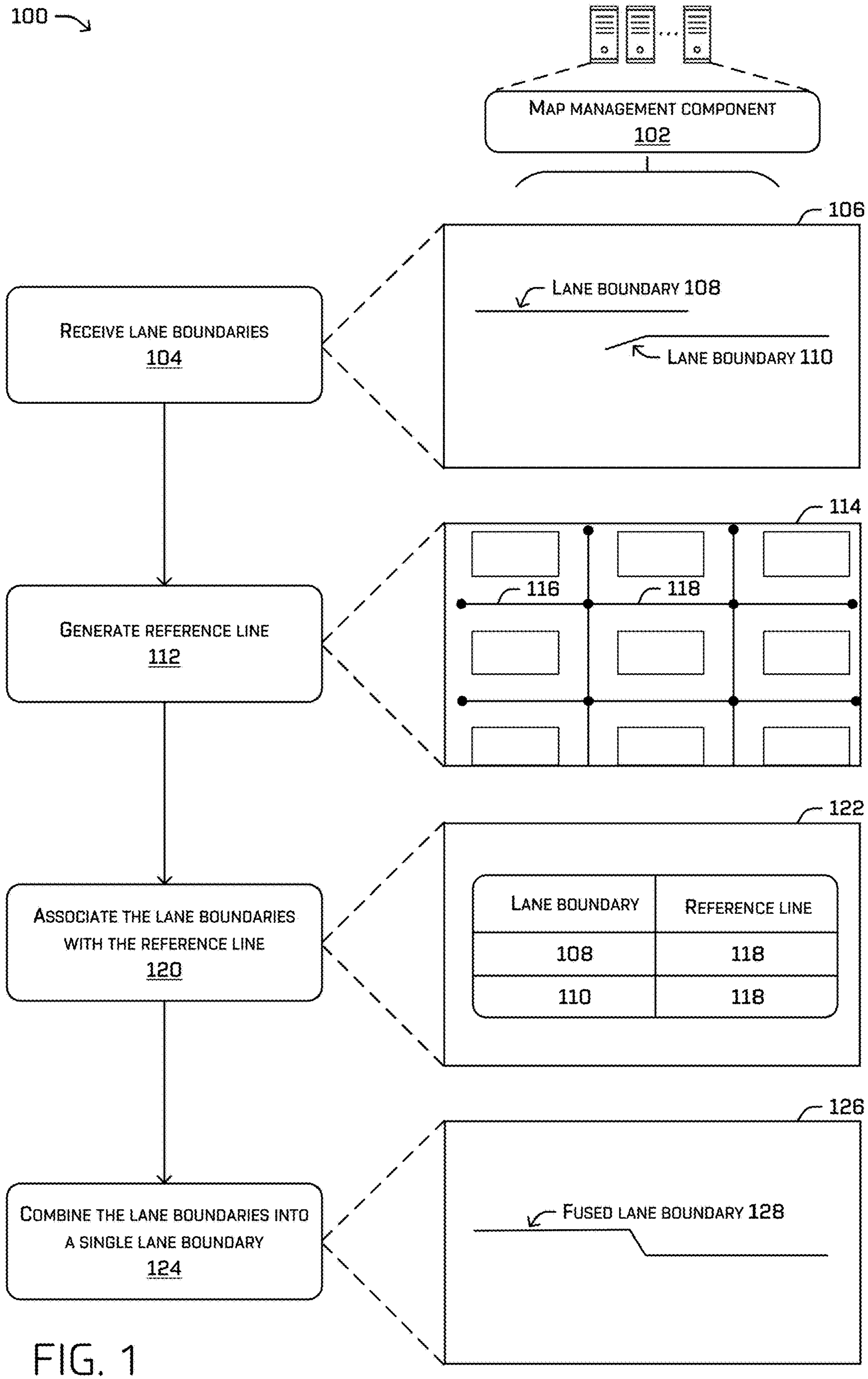
FIG. 1 is a pictorial flow diagram illustrating an example technique for generating lane boundaries, in accordance with one or more examples of the disclosure.

Techniques for generating accurate lane boundary representations in map data are described herein. In some examples, a map management component may receive image data of a portion of an environment and input such image data into a machine-learned model trained to detect and/or output representations of lane boundaries. As a non-limiting example of which, data (e.g., sensor data, satellite data, third party data, etc.) may be partitioned into regions and data associated with each region may be input into the machine learned model. Additionally, the map management component may generate and/or receive a set of reference lines (e.g., edges between nodes associated with central positions of junctions) that represent the road network of the environment. Based on receiving the lane boundaries from the machine-learned model, the map management component may assign (or associate) lane boundaries to the reference lines, e.g., based on distance from the reference line, direction relative to the reference line, crossing of geometries (e.g., a drivable surface boundary), etc. After associating, such detected lane boundaries may further be clustered. In some examples, for the lane boundaries associated with a reference line, the map management component may fuse (or refine) the lane boundaries such that there is a single lane boundary corresponding to a single real-world lane boundary. The map management component may cause the single lane boundary to be stored within map data and transmit the map data to a real-world vehicle and/or use the map data directly on a vehicle. As discussed throughout this disclosure, the techniques described herein may improve vehicle safety and/or driving efficiency by increasing the accuracy of map data by reducing duplicative and/or inaccurate lane boundaries, thereby allowing the vehicle to perform safer and more efficient driving maneuvers.

When building (or generating) a map of the environment, it may be beneficial to increase the accuracy of the lane boundaries. For example, a vehicle or remote system may generate a map of the environment which may include data associated with the attributes of the environment (e.g., traffic data, road type data, lane boundary data, etc.), the static object(s) included therein, etc. However, in some circumstances, the techniques used to generate the map data may result in inaccurate locations and representations of the lane boundaries of the roadways. For example, the systems may receive image data of the environment. In some cases, the image data may represent a region of the environment such as a 50 meter×50 meter region. The systems may input the image data of the region into a machine-learned model which may be trained to output the location and/or the dimensions of the lane boundary for the specified region. However, in some cases, the lane boundaries for the different regions may fail to connect, may overlap longitudinally and/or laterally, may not be accurate, or otherwise. Such inaccuracies may result in the vehicle generating actions based on the lane boundaries being located in a certain location when the lane boundary is actually located in a different location. As such, the systems and/or techniques described herein increase the accuracy of the location and/or dimensions of the lane boundaries which may increase the ability of the vehicle to predict and/or generate actions for the vehicle to follow.

To address these and other technical problems and inefficiencies, the systems and/or techniques described herein include a map generating component (which also may be referred to as a "map component" or a "map generating system") configured to generate map data with accurate representations of lane boundaries. Technical solutions discussed herein solve one or more technical problems associated with generating multiple lane boundaries for a single real-world lane boundary and/or generating fragmented (or disconnected) lane boundaries which may be used, for example, in autonomous vehicles for traversing an environment.

In some examples, the map management component may generate or receive a reference line that defines a portion of the road network within an environment. That is, the reference line may be defined by node(s), or point(s), associated with junctions and edge(s) that connect the nodes. In some examples, the edges may follow a center portion of the roadway between two nodes though the disclosure is not meant to be so limiting as any reference line position is contemplated. The map management component may determine the reference line by receiving third party data (e.g., city maps, organization maps, etc.), log data, user input, etc. Based on receiving such data, the map management component may input such data into a machine-learned model trained to output reference lines that define the road network of an environment. The reference line(s) may include one or more types of data such as location data (e.g., location of a point along the reference line), heading data (e.g., heading of the reference line or a point along the reference line), etc. In additional or alternative examples, such node locations may be defined by a user as input via an input device and resultant reference lines may be determined as those lines which connect the nodes, regardless of their relative positions or orientations to actual streets.

In some examples, the map management component may determine lane boundaries based on inputting image data into machine-learned model(s) trained to output detected lane boundaries. The lane boundary may be an edge (or boundary) of a driving lane that is depicted to the environment as a lane marking. In some examples, a vehicle may include one or more image capturing devices. In at least some examples, such lane boundaries may be associated with a lane boundary type (e.g., single yellow, single white, double yellow, dashed yellow, etc.) and the techniques described herein may be performed for each type. Of course, the techniques described herein may be equally applied without such lane boundary type information. Such device (s) may be configured to capture image data of the environment from unique perspectives. Further, the image data may correspond to a specific region or section of the environment. In some cases, the regions may be distinct from one another while in other examples the regions may include at least a portion of overlap. The image data may include lane boundaries of the driving lanes upon which the vehicle navigates.

Based on receiving such image data, the map management component may input the image data into a machine-learning model trained to output lane boundaries. That is, the map management component may input the image data from each region into the machine-learning model. In some cases, the machine-learning model may output contiguous lane boundaries for the region. The lane boundary output by the machine-learning model may correspond to a real-world lane boundary.

As noted above, in some cases, the lane boundaries of different regions may not connect or may overlap longitudinally or laterally with lane boundaries from other regions. As such, the map management component may associate the lane boundaries with a reference line, cluster the lane boundaries of a reference line, and generate a single lane boundary that corresponds to the real-world lane boundary.

For example, the map management component may associate the lane boundaries to reference lines. That is, upon receiving the lane boundaries, it may be important to determine to which reference line each lane boundary corresponds. As such, the map management component may assign a lane boundary to a reference line based on a cost. The cost may include one or more sub-costs such as a distance-based cost, a heading-based cost, a cost associated with the line crossing some geometry, and the like. In some cases, the map management component may determine the distance-based sub-cost by determining a distance from the closest point of the lane boundary to the reference line, an average distance between the lines, a total distance between the lines, an area between the lines, or the like. The distance may be used to determine the distance-based cost in which a high cost corresponds to a large distance and a low cost corresponds to a small distance. In this example, a low cost may correspond to a higher likelihood of association. Further, the map management component may determine the heading-based sub-cost by determining a difference in heading between the lane boundary and the reference line. The difference in heading may be used to determine the heading-based sub-cost in which a high cost corresponds to a large difference in heading and a low cost corresponds to a small difference in heading. In some examples, the map management component may determine a combined cost by combining the distance-based sub-cost with the heading-based sub-cost and any other cost contemplated for clustering. In some cases, the map management component may determine a combined cost between each lane boundary and reference line. As such, the map management component may assign (or associate) a lane boundary to a reference line based on the combined cost being the lowest of the multiple combined costs. As such, the result may include one or more lane boundaries associated with different reference lines.

In some examples, the map management component may cluster lane boundaries that are associated with a reference line. As a note, the assignment operation may associate lane boundaries with a reference line based on a cost whereas this clustering operation may include clustering lane boundaries that have already been associated with a reference line. That is, a single reference line may include lane boundaries that correspond to different real-world lane boundaries. As such, the map management component may cluster the lane boundaries such that each cluster corresponds to a separate real-world lane boundary. The map management component may determine the clusters by computing, for each individual lane boundary associated with a particular reference line, a distance between all other lane boundaries and clustering the lane boundaries with distances below a threshold. Additionally or alternatively, the map management component may use any other type of clustering technique.

In some examples, the map management component may modify (or fuse) the lane boundaries within a cluster into a single, contiguous lane boundary. That is, the map management component can refine (or fuse) the lane boundaries together to create a single, contiguous lane boundary. In some examples, the map management component may perform the fusing operations using a point-to-point technique or a lane boundary segment technique.

For example, when fusing two lane boundaries, the map management component may place points (or nodes) along each of the lane boundaries. The points may be spaced at a predetermined distance (e.g., one meter, five meters, 15 meters, etc.). Further, the map management component may associate one or more points (e.g., a set of points) for each lane boundary within a cluster. For examples, such points may comprise a point at the start of each lane boundary (e.g., starting point), a point at the end of each lane boundary (e.g., ending point), and/or additional points (or a set of points) at regular intervals. For each point, the map management component may connect the point to other points (on the same or different lane boundary) that are within a threshold distance. That is, if the threshold is 10 meters, the map management component may connect a point to all other points on the same or different lane boundary that are within 10 meters of the point. However, the map management component may not connect points if the distance between the points meets or exceeds 10 meters. Accordingly, a single point may be connected to multiple other points. All such points may then be projected on the reference line to determine a minimum arc length and maximum arc length along the reference line. Finally, a resultant line may be determined as a line having a minimum length passing through all points associated with a cluster from the minimum arc length to the maximum arc length. As such, the map management component may determine a single lane boundary by determining a shortest path along the lane boundaries. That is, the map management component may use the reference line as a reference that spans from a starting point to an ending point. Upon fusing the lane boundaries, the map management component may iterate the fusing process such that upon fusing two lane boundaries, the map management component may proceed to perform such operations again on the remaining unfused lane boundary segments.

Additionally or alternatively, the map management component may fuse the lane boundaries based on segments of the lane boundaries. For example, the map management component may place a point at the beginning and end of each lane boundary. Further, the map management component may determine (or identify) the closest points between the first lane boundary and the second lane boundary. That is, the map management component may identify a first location along the first lane boundary and a second location along the second lane boundary that results in the shortest distance between the two lane boundaries. In some cases, the map management component may place a point at the first location and a point at the second location and create an edge that extends between the first and second points. In such examples, the points at the first and second locations as well as the start and end of the lane boundaries may then be projected on the reference line to determine a minimum arc length and maximum arc length along the reference line. Finally, a resultant line may be determined as a line having a minimum length passing through all points associated with a cluster from the minimum arc length to the maximum arc length. That is, similar to the point-to-point operation described above, the map management component may determine a single lane boundary by determining a shortest path along the lane boundaries. Further, similar to above, the map management component may iterate the fusing process such that upon fusing two lane boundaries, the map management component may proceed to perform such operations again on the remaining unfused lane boundary segments.

Based on fusing the lane boundaries, the map management component may generate map data that includes the single lane boundary. That is, the map management component may cause the single, contiguous lane boundary to be used and/or stored within the map data. Further, the map management component may send (or transmit) the map data to one or more real-world vehicles that are configured to use the map data and/or the lane boundaries included therein when navigating the environment.

Additionally or alternatively, the map management component may remove segments (or chunks) of the lane boundaries that are not to be included in the single, contiguous lane boundary. That is, in some cases, clusters may include duplicative lane boundaries and/or lane boundaries that were not included in the shortest path. In such cases, the map management component may remove these segments based on such segments being located within a buffer polygon. That is, it may be important to retain lane boundary segments that actually correspond to lane boundaries. As such, the map management component may generate a buffer around the single, fused lane boundary. The buffer may be a polygon that extends laterally by a predetermined distance. In such cases, the map management component may remove any lane boundary segment that is located within the polygon.

In at least some examples, such a fused lane boundary may be filtered further to remove any inconsistencies and/or to ensure that the boundary conforms to generally expected properties of lane boundaries (e.g., relatively straight or constant curvature, and the like). The lane boundaries may be used by a vehicle, whether computed on-vehicle or received from a remote endpoint.

The techniques described herein can improve the functioning, safety, and efficiency of autonomous and/or semi-autonomous vehicles operating in various driving environments. Utilizing these lane boundary fusion techniques may increase the accuracy of the lane boundaries within the map data which may result in more accurate and/or effective vehicle actions. For example, the vehicle may rely on the lane boundaries when determining how and/or where to drive within a driving lane to optimally navigate amongst one or more objects in the environment. If the lane boundaries are inaccurate, the vehicle may follow trajectories that place the vehicle in suboptimal locations within the driving lane relative to the object(s) proximate to the vehicle.

The techniques described herein may be implemented in several ways. Example implementations are provided below with reference to the following figures. Although discussed in the context of an autonomous vehicle, the methods, apparatuses, and systems described herein may be applied to a variety of systems, and are not limited to autonomous vehicles. In another example, the techniques may be utilized in an aviation or nautical context, or in any other system. Additionally, the techniques described herein may be used with real data (e.g., captured using sensor(s)), simulated data (e.g., generated by a simulator), or any combination of the two.

FIG. 1 is a pictorial flow diagram illustrating an example process 100 for generating lane boundaries. As shown in this example, some or all of the operations in the example process 100 may be performed by a map management component 102, a perception component, a prediction component, and/or any other component or systems remote from, or within, an autonomous vehicle. For instance, as shown in this example, example process 100 may be implemented using a map management component 102 that may be remote from the vehicle.

At operation 104, the map management component 102 may receive lane boundaries. That is, in some examples, the map management component 102 may receive image data from one or more image capturing devices associated with a vehicle or fleet of vehicles, satellite data, or otherwise. In such cases, the map management component 102 may input the data into a machine-learned model trained to output lane boundaries. However, in some situations, the data may correspond to a specific region of the environment (e.g., a 100 m×100× square) and as such, the lane boundaries may be disconnected from the lane boundaries of other regions of the environment. For example, box 106 illustrates two distinct lane boundaries. In this example, box 106 may include a lane boundary 108 and a lane boundary 110. As shown, the lane boundary 108 is not connected to the lane boundary 110. In this example, the image data may have overlapped regions and as such, the lane boundaries may overlap longitudinally.

At operation 112, the map management component 102 may generate or receive reference lines that define the road network of an environment. As described above, a reference line may be an edge that extends between two nodes. In some examples, the nodes may be placed at junctions (e.g., the center of a junction) within an environment. As such, the map management component 102 may generate multiple reference lines for an environment. For example, box 114 illustrates multiple reference lines. In this example, the box 114 may include a gridded environment. The box 114 may include the reference line 116 and the reference line 118. Of course, box 114 illustrates many more reference lines that are not labeled. In this example, the reference line 116 may span between two nodes that are placed within junctions of the environment. The reference line 118 may span between two nodes that are placed within junctions of the environment. As shown, the reference line 116 and the reference line 118 may share a common node.

At operation 120, the map management component 102 may associate the lane boundaries with the reference lines. The map management component 102 may associate the lane boundaries to a single reference line, as determined at operation 112. The map management component 102 may assign the lane boundaries by determining cost values between lane boundaries and reference lines. That is, the map management component 102 may determine a cost value between the lane boundary 108 and the reference line 116, a cost between the lane boundary 108 and the reference line 118, etc. The cost may be determined based on a distance sub-cost, a heading sub-cost, a geometry sub-cost, and the like. For example, the distance sub-cost may be determined based on a distance from the closest part of the lane boundary to the reference line, whereas the heading sub-cost may be determined based on a difference in heading angle between the lane boundary and the reference line. Additional description regarding generating the costs is discussed in FIG. 2. In some cases, the map management component 102 may assign the lane boundary to the reference line with which the lane boundary has the lowest cost. For example, box 122 illustrates a table with assigned lane boundaries. In this example, box 122 illustrates that the lane boundary 108 is assigned to the reference line 118 and the lane boundary 110 is assigned to the reference line 118.

At operation 124, the map management component 102 may combine the lane boundaries into a single lane boundary. That is, the map management component 102 may fuse the lane boundaries that are associated with the same reference line into a single, contiguous lane boundary. The map management component 102 may fuse or connect lane boundaries by placing nodes along the lane boundaries, connecting nodes that are within a threshold distance from one another (e.g., from the same or different lane boundary), determining a shortest path from a starting point to an ending point, and fusing the lane boundaries to create a single lane boundary that is consistent with the shortest path. Additionally or alternatively, the map management component 102 may identify the closest points between first and second lane boundaries, place an edge extending between such points, determine a shortest path from a starting point to an ending point, and fuse the lane boundaries to create a single lane boundary that is consistent with the shortest path. Additional detail regarding fusing the lane boundaries may be described in FIGS. 3-5. For example, the box 126 illustrates a fused lane boundary 128. In this example, the box 126 may include the same lane boundaries as shown in box 106. However, in this case, the lane boundary 108 and the lane boundary 110 may be fused into a single lane boundary. In some cases, the fused lane boundary 128 may be used or stored within map data. The map management component 102 may send the map data to a vehicle to use while navigating an environment.

Figure 2:
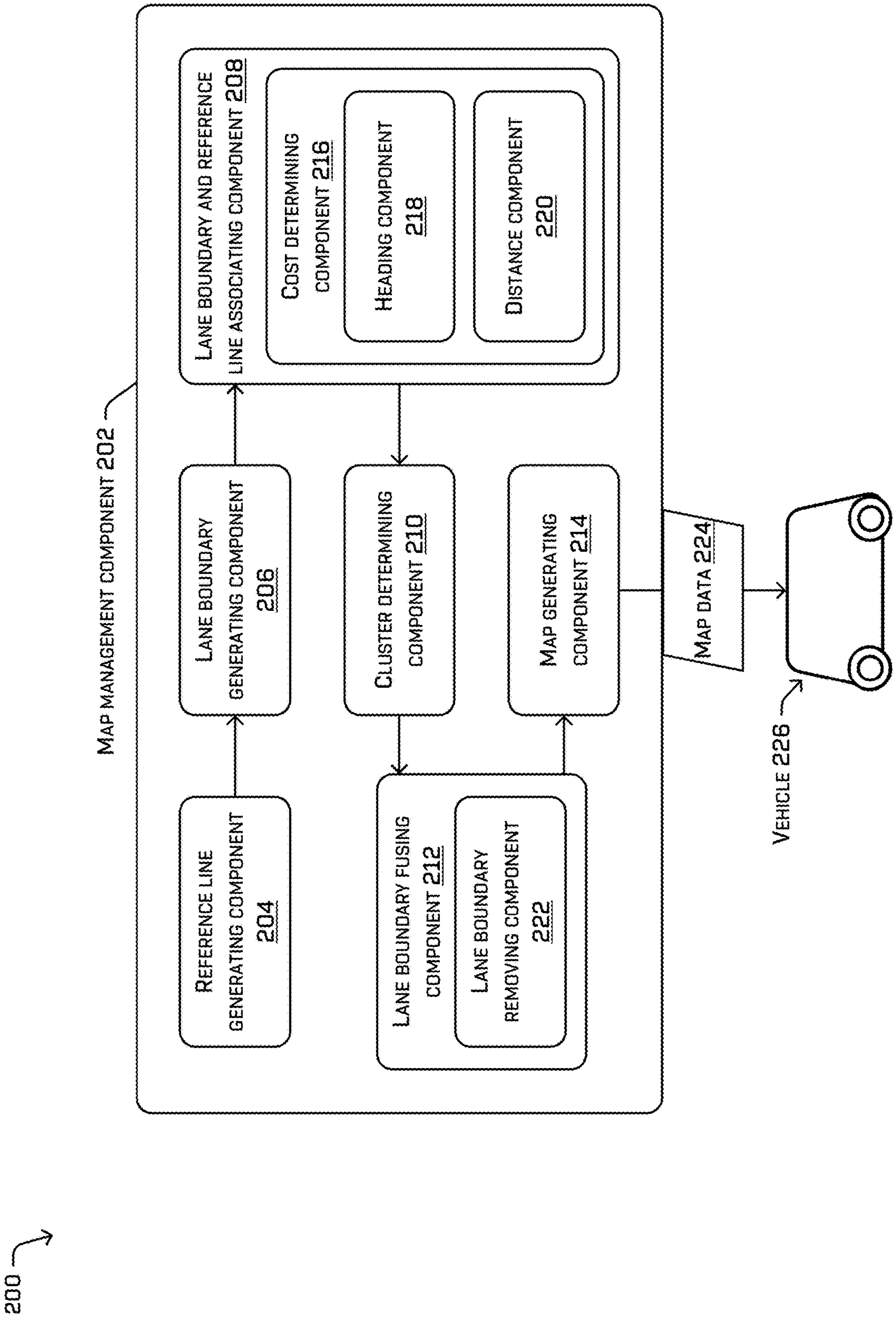
FIG. 2 depicts an example computing system including a map management component configured to generate map data of an environment, in accordance with one or more examples of the disclosure.

FIG. 2 depicts an example computing system 200 including a map management component 202 configured to generate map data of an environment.

In some examples, the map management component 202 may be similar or identical to the map management component 102 described above, or in any other examples herein. As noted above, in some cases, the map management component 202 may be a component of an autonomous vehicle. That is, the operations described herein may be performed on a vehicle and/or remote from a vehicle. In some examples, the map management component 202 may include various components, described below, configured to perform different functionalities of a map generating technique. In some examples, some or all of the subcomponents of the map management component 202 may be integrated in a remote server-based system while other subcomponents may be integrated in on-vehicle systems. In some examples, the map management component 202 may include a reference line generating component 204 configured to generate reference lines that represent a road network of the environment, a lane boundary generating component 206 configured to generate lane boundaries, a lane boundary and reference line associating component 208 configured to associate lane boundaries with reference lines, a cluster determining component 210 configured to determine clusters of lane boundaries associated with a single reference line, a lane boundary fusing component 212 configured to fuse lane boundaries into a single, contiguous lane boundary, and/or a map generating component 214 configured to generate map data.

In some examples, the map management component 202 may include a reference line generating component 204 configured to generate/receive reference lines that represent a road network of the environment. The reference line generating component 204 may generate multiple reference lines that define the road network. A single reference line may span between two nodes. In some examples, a node may be placed at each junction and/or modification of lane structure. An edge may span between two nodes and may fit the shape and/or curvature of the roadway. Each edge may be considered a reference line. As noted above, a reference line may include heading data (e.g., heading for some or all points along the reference line), location data (e.g., coordinate data for some or all points along the reference line), etc. In some examples, the reference line generating component 204 may generate the reference lines by receiving third party data, user input, and/or log data. The reference line generating component 204 may input such data into one or more machine-learned models trained to output reference lines. Additionally or alternatively, the reference line generating component 204 may generate the reference lines (e.g., geometric lines) based on placing nodes at junctions (or intersections) and connecting two nodes with the reference lines.

In some examples, the map management component 202 may include a lane boundary generating component 206 configured to generate lane boundaries. In some examples, the lane boundary generating component 206 may include one or more machine-learned models that are trained to detect representations of lane boundaries within image data. For example, the lane boundary generating component 206 may receive image data from one or more image capturing devices associated with a vehicle. Further, the lane boundary generating component 206 may input such image data into a machine-learning model. The machine-learning model may output detections (or representations) of lane boundaries as included in the image data. In some examples, due to the image data covering different and/or overlapping regions of the environment, the machine-learning model may output disconnected and/or overlapping lane boundaries.

In some examples, the map management component 202 may include a lane boundary and reference line associating component 208 configured to associate lane boundaries with reference lines. The lane boundary and reference line associating component 208 may receive the lane boundaries from the lane boundary generating component 206 and the reference lines from the reference line generating component 204. In some examples, the lane boundary and reference line associating component 208 may assign lane boundaries to one of the multiple reference lines. For example, the lane boundary and reference line associating component 208 may determine a cost that indicates how likely that the lane boundary is associated with a particular reference line. As shown, the lane boundary and reference line associating component 208 may include one or more subcomponents such as the cost determining component 216. The cost determining component 216 may be configured to determine the cost values between a lane boundary and a reference line. The cost determining component 216 may include a heading component 218, a distance component 220, a geometry cost, and/or otherwise. Such components may determine sub-costs that may be combined into a single, overall cost to be used when assigning lane boundaries to reference lines.

For example, the heading component 218 may determine a heading-related cost. The heading component 218 may determine the cost by comparing a heading of the lane boundary with a heading of the reference line, determining a difference between the headings, and determining a cost value based on the difference. As noted above, a high cost may indicate a low likelihood that the lane boundary corresponds to the reference line while a low cost indicates a high likelihood that the lane boundary corresponds to the reference line. As such, if the difference in headings is large, the heading component 218 may determine a large cost value. Conversely, if the difference in heading is small, the heading component 218 may determine a low cost value.

Further, the distance component 220 may determine a distance-related cost. The distance component 220 may determine the cost by determining a distance from the closest location along the lane boundary to the reference line. Similar to the heading component 218, if the distance is large, the distance component 220 may determine a large cost value. In contrast, if the distance is small, the distance component 220 may determine a low cost value. Additionally or alternatively, the distance component may determine the overall distance by determining distance values for different points along the lane boundary to the reference line, identifying the point that is the closest, and determining the overall distance based on the closest point. Further, the distance component may also aggregate the distance values of the other points along the lane boundary and include these distances in the overall distance calculation.

In such cases, the cost determining component may combine the heading cost and the distance cost into a single cost value. Based on determining the single cost between a single lane boundary and single reference line, the lane boundary and reference line associating component 208 may determine a separate cost for the lane boundary and some or all other reference lines. In such cases, the lane boundary and reference line associating component 208 may assign the lane boundary to the reference line with which the lane boundary has the lowest cost.

In some examples, the map management component 202 may include a cluster determining component 210 configured to determine clusters of lane boundaries associated with a single reference line. For example, the cluster determining component 210 may group the lane boundaries that are assigned to the same reference line into different clusters. In this example, each cluster may represent the lane boundaries that all belong to the same real-world lane boundary. The cluster determining component 210 may perform the clustering by determining, for each independent lane boundary, a distance between the other lane boundaries assigned to the same reference line. In such cases, the cluster determining component 210 may cluster the lane boundaries together if the distance(s) are below a threshold. Additionally or alternatively, the cluster determining component 210 may use any other type of clustering technique to cluster the lane boundaries. In some examples, the cluster determining component 210 may use one or more clustering algorithms such as Dijkstra's algorithm, A*, D*, etc.

In some examples, the map management component 202 may include a lane boundary fusing component 212 configured to fuse lane boundaries into a single, contiguous lane boundary. The lane boundary fusing component 212 may fuse the lane boundaries from a single cluster into a single lane boundary. For example, in some cases, the lane boundary fusing component 212 may place points (or nodes) along the lane boundaries, determine a shortest path from a point associated with a minimum arclength along the reference line to a point associated with a maximum arclength along the reference line. Additionally or alternatively, the lane boundary fusing component 212 may identify the closest points between a first and second lane boundaries, place an edge extending between such points, determine a shortest path from a starting point to an ending point, and fuse the lane boundaries to create a single lane boundary that is consistent with the shortest path. Additional detail regarding fusing the lane boundaries may be described in FIGS. 3-5. Such portions may be iterated repeatedly after removing those fused portions from the set associated with the cluster.

As shown, the lane boundary fusing component 212 may include a lane boundary removing component 222. The lane boundary removing component 222 may be configured to remove segments and/or chunks of lane boundary that were not included in the fused lane boundary. For example, the lane boundary fusing component 212 may generate a buffer (or polygon) around the fused lane boundary. In such cases, the lane boundary fusing component 212 may remove, discard, and/or exclude any lane boundaries that are located within the buffer and are not included in the fused lane boundary. Accordingly, the lane boundary removing component 222 may filter the lane boundaries to remove inconsistencies. Such removal (or filtering) operations may increase the likelihood that the lane boundary conforms to expected properties of lane boundaries (e.g., relatively straight or constant curvature, and the like).

In some examples, the map management component 202 may include a map generating component 214 configured to generate map data. Based on fusing the lane boundaries, the map generating component 214 may generate map data 224 that may include the fused lane boundaries. That is, the map generating component 214 may cause the fused, contiguous lane boundary to be included in the map data 224. Further, the map generating component 214 may send (or transmit) the map data 224 to a vehicle 226 or a fleet of vehicles navigating an environment. The vehicle 226 may use the map data when detecting and/or classifying objects, when predicting object behaviors, and/or when planning or generating vehicle actions.

Figure 3:
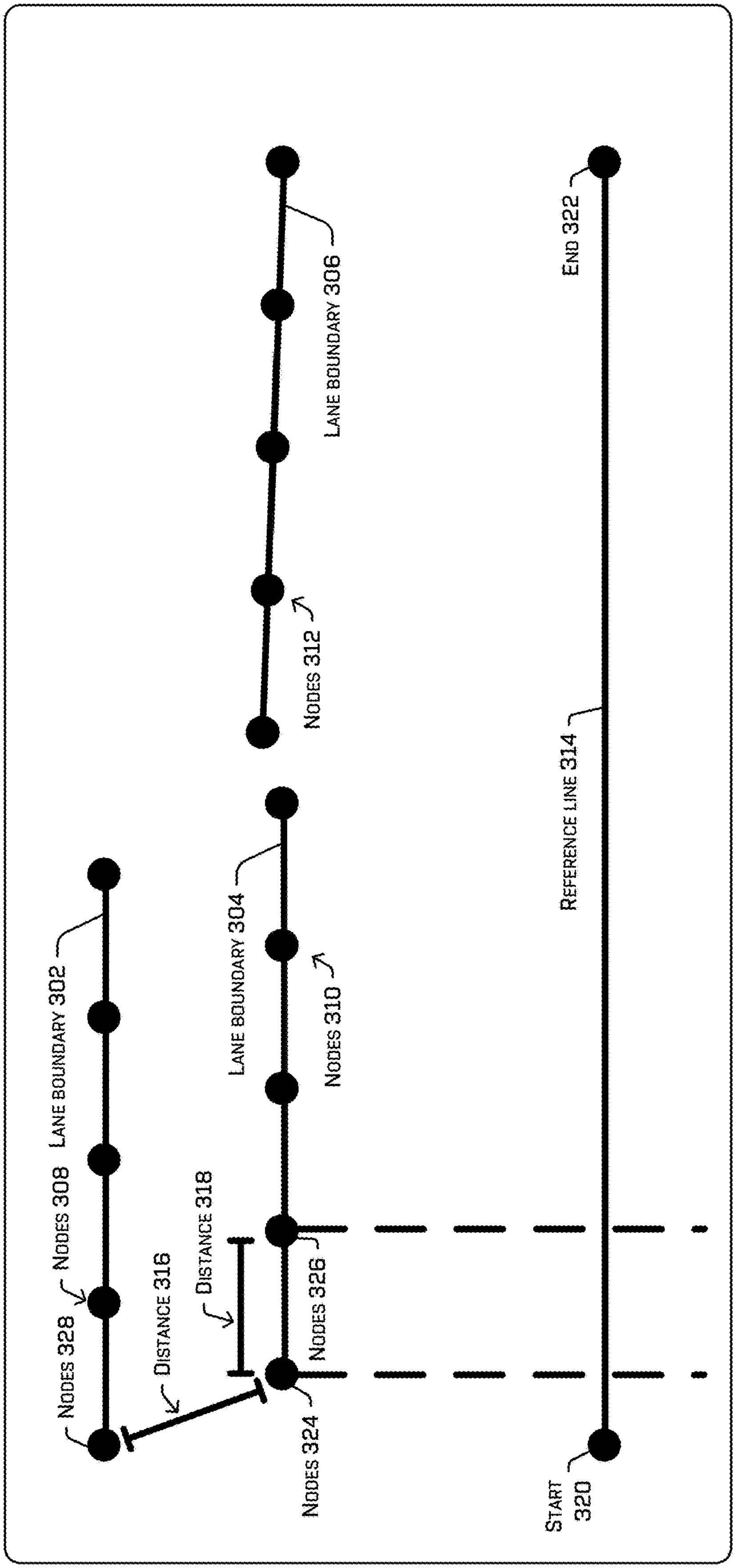
FIG. 3 depicts an example environment including lane boundaries that are fused using a point-to-point technique, in accordance with one or more examples of the disclosure.

FIG. 3 depicts an example environment 300 including lane boundaries that are fused using a point-to-point technique.

In this example, the example environment 300 may include a lane boundary 302, a lane boundary 304, and a lane boundary 306. As shown, the lane boundaries may be located at different lateral and/or longitudinal positions within the environment. In this case, the lane boundary 302 may include nodes 308 located at various positions. For example, the lane boundary 302 may include a node at a start and at an end of the lane boundary as well as at one or more locations between the starting and ending points. Further, the lane boundary 304 may include nodes 310 located at various positions. For example, the lane boundary 304 may include a node at a start and at an end of the lane boundary as well as at one or more locations between the starting and ending points. The lane boundary 306 may include nodes 312 located at various positions. For example, the lane boundary 306 may include a node at a start and at an end of the lane boundary as well as at one or more locations between the starting and ending points.

In some examples, the map management component may connect nodes based on such nodes being within a threshold distance from one another. For example, for node 324, the map management component may connect the node 324 with some or all nodes that are within a distance (or threshold) of, for example, 10 meters. As such, the map management component may determine a distance 316 to the node 328 and determine that the distance 316 meets or exceeds the threshold distance of 10 meters and as such, the map management component may not connect the node 324 to the node 328. Further, the map management component may determine a distance 318 to the node 326 and determine that the distance 318 is less than the threshold distance of 10 meters and as such, the map management component may connect the node 324 to the node 326. In some examples, the map management component may perform such operations for some or all nodes within the example environment 300. As such, in some instances, the result may be nodes connected to one or more other nodes (of the same or different lane boundary) with associated distances between such nodes.

In some examples, the map management component may fuse the lane boundaries into a single lane boundary by determining a shortest path from a starting point to an ending point. For example, the map management component may use the reference line 314 with which the lane boundaries are associated. The reference line 314 may be used to as a reference to determine a minimum and/or maximum extrema of the one or more lane boundaries. As shown, the reference line 314 may include a start point 320 and an end point 322. The map management component may perform the shortest path operation starting from the start point 320 and moving along the lane boundaries to the end point 322. That is, in some cases, the map management component may project the nodes onto the reference line 314 based on where such nodes are located within the environment. In such cases, the map management component may determine a shortest path by analyzing the distance values of the nodes with which the projected nodes are connected. That is, the shortest path may be the path between the minimum and maximum extrema of the reference line as defined by the lane boundaries within the cluster. The result may be a connected, fused lane boundary.

Figure 4:
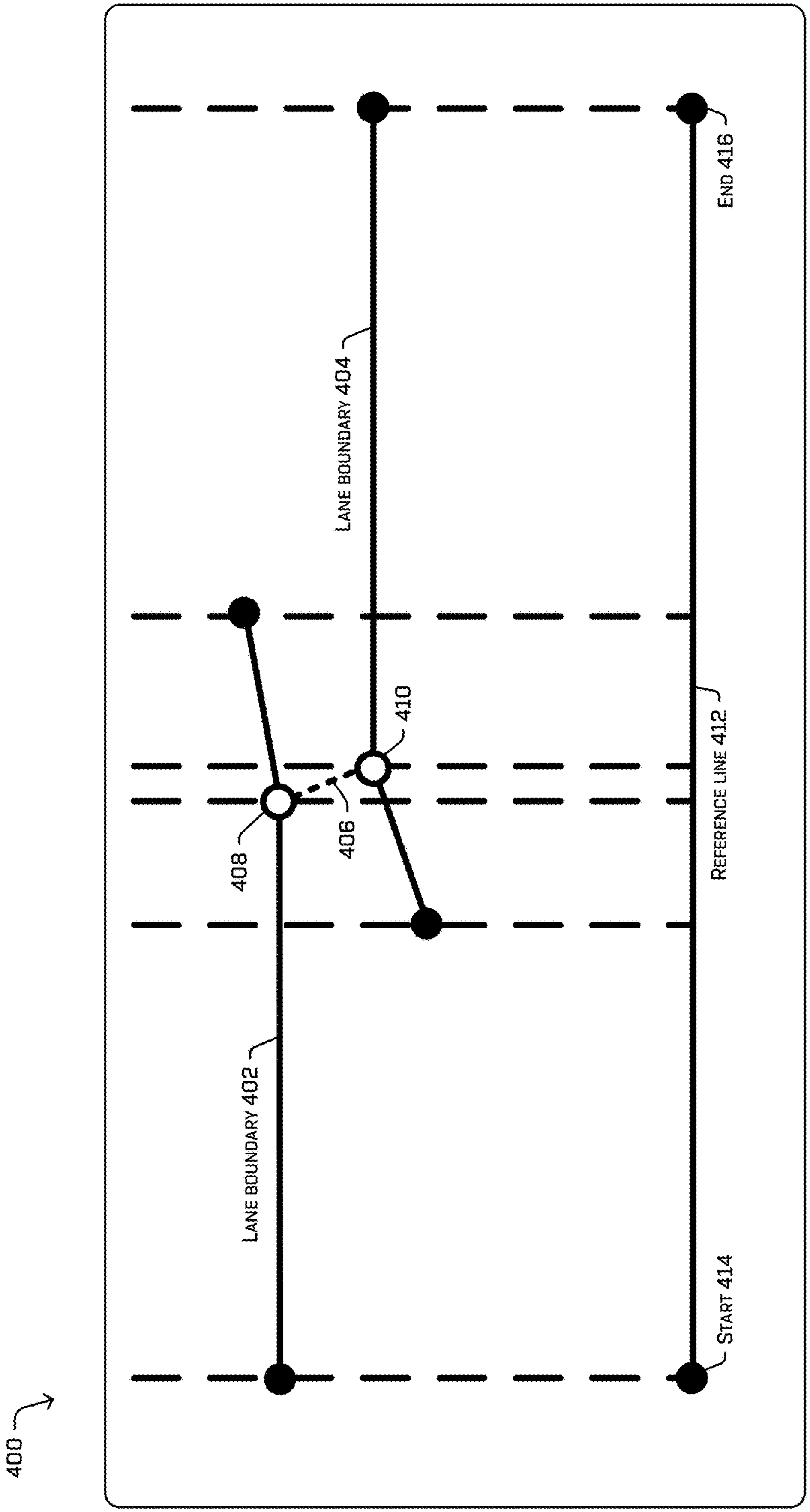
FIG. 4 depicts an example environment including lane boundaries that are fused using segments of the lane boundaries, in accordance with one or more examples of the disclosure.

FIG. 4 depicts an example environment 400 including lane boundaries that are fused using segments of the lane boundaries.

In this example, the example environment 400 may include a lane boundary 402 and a lane boundary 404. As shown, the lane boundaries may be located at different lateral and/or longitudinal positions within the environment. The lane boundaries may include nodes located at the start and end of the lane boundary. For example, the lane boundary 402 may include a node at the start of the lane boundary and a node at the end of the lane boundary 402. Further, the lane boundary 404 may include a node at the start of the lane boundary 404 and a node at the end of the lane boundary 404.

In some examples, the map management component may identify a location along the lane boundaries that are the closest to one another. For example, the map management component may identify that the location of the node 408 and the location of the node 410 are the closest locations along the lane boundaries to one another. Based on identifying such locations, the map management component may place nodes at the locations. For example, the node 408 may represent the location along the lane boundary 402 and the node 410 may represent the location along the lane boundary 404. Based on placing the nodes on the lane boundaries, the map management component may generate an edge 406 that extends between the nodes.

In some examples, the map management component may fuse the lane boundaries into a single lane boundary by determining a shortest path from a starting point to an ending point. For example, the map management component may use the reference line 412 with which the lane boundaries are associated. As shown, the reference line 412 may include a start point 414 and an end point 416. The map management component may perform the shortest path operation starting from the start point 414 and moving along the lane boundaries to the end point 416. That is, in some cases, the map management component may project the nodes onto the reference line 412 based on where such nodes are located within the environment. In such cases, the map management component may determine a shortest path by following the connected edges (e.g., edge 406) between the lane boundaries with which the projected nodes are connected. The result may be a connected, fused lane boundary.

Figure 5:
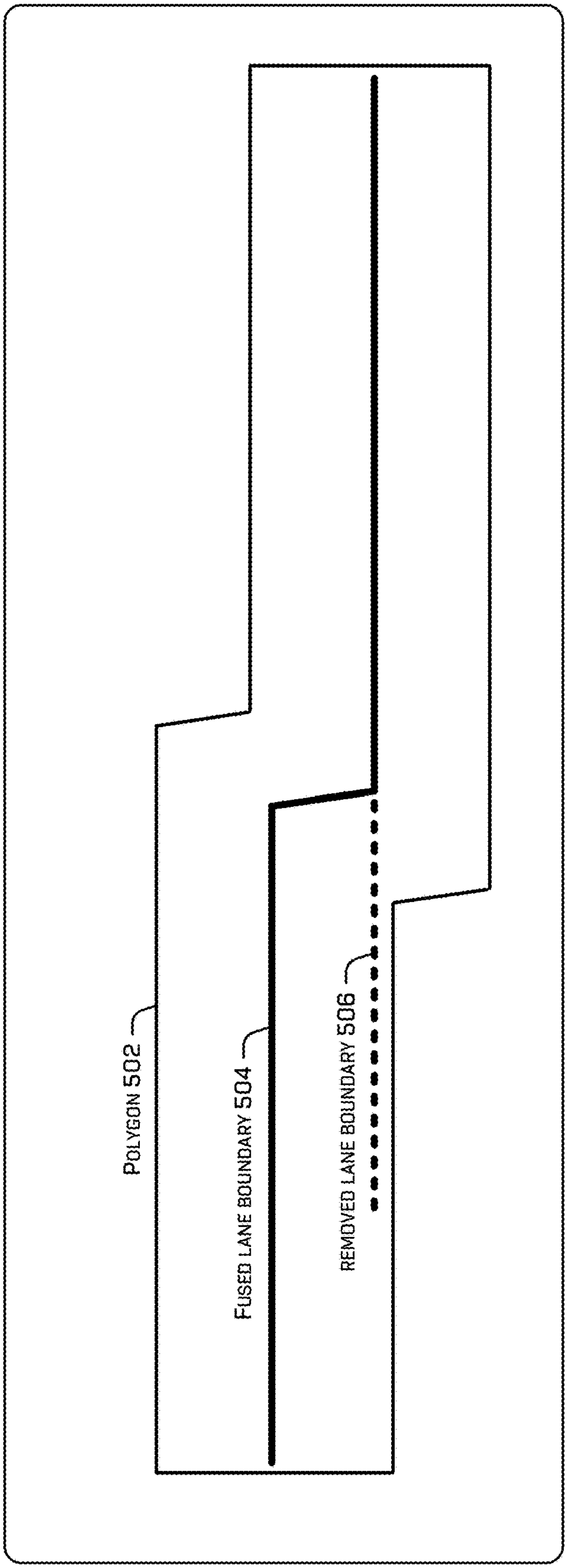
FIG. 5 depicts an example environment including a polygon used to remove inaccurate lane boundaries, in accordance with one or more examples of the disclosure.

FIG. 5 depicts an example environment 500 including a polygon 502 used to remove inaccurate lane boundaries.

In this example, the example environment 500 may include a fused lane boundary 504. As shown, the fused lane boundary 504 may be the result of a fusing technique such as that described with reference to FIGS. 1-4. In this example, the example environment 500 may also include a segment of a lane boundary 506 that was not included in the fused lane boundary 504. As such, when determining whether to perform additional fusing operations or to remove the lane boundary 506, the map management component may generate a polygon 502 that encompasses the fused lane boundary 504. As shown, the polygon 502 may span a distance on either side of the fused lane boundary 504. Further, the polygon 502 may be similarly shaped to the fused lane boundary 504. When generating the polygon 502, the map management component may determine a distance to extend the polygon 502 from the fused lane boundary 504 and, for each point along the fused lane boundary, the map management component may determine the border of the polygon 502 that is a perpendicular distance from the fused lane boundary 504.

In some examples, the map management component may remove lane boundary segments that are not included in the fused lane boundary 504 and are located within the polygon 502. That is, the map management component may determine that the lane boundary 506 is not part of the fused lane boundary 504 and is also located within the polygon 502. As such, the map management component may remove the lane boundary 506 from the example environment. Further, the map management component may ensure that the lane boundary 506 is not included in the generated map data. Additionally or alternatively, though FIG. 5 describes removing lane boundaries based on portions of such boundaries being within a buffer, the map management component may also remove portions of lane boundaries based on such portions being within a threshold distance of the fused lane boundary 504.

Figure 6:
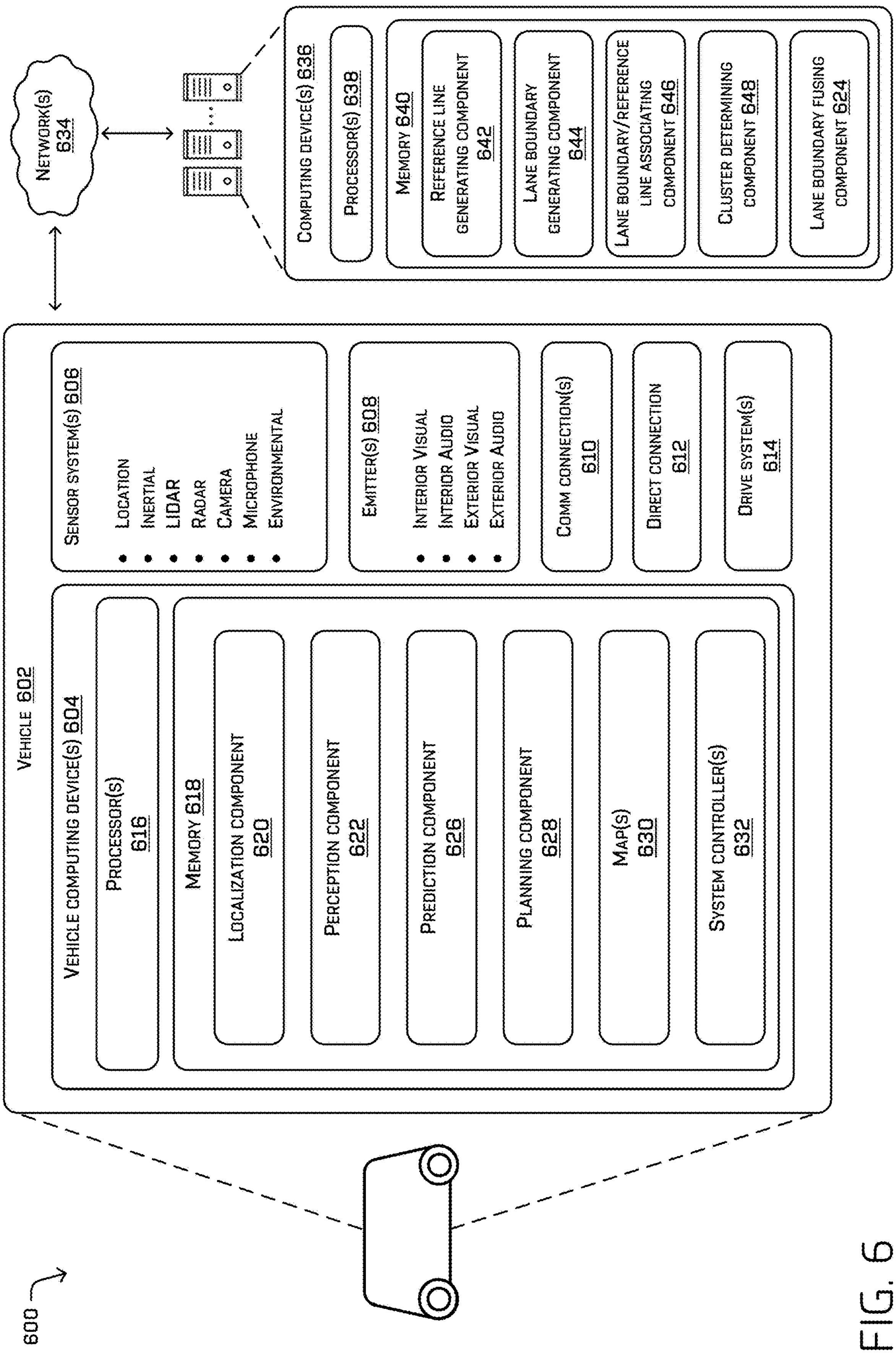
FIG. 6 depicts a block diagram of an example system for implementing various techniques described herein.

FIG. 6 is a block diagram of an example system 600 for implementing the techniques described herein. In at least one example, the system 600 may include a vehicle, such as vehicle 602. The vehicle 602 may include one or more vehicle computing devices 604, one or more sensor systems 606, one or more emitters 608, one or more communication connections 610, at least one direct connection 612, and one or more drive systems 614.

The vehicle computing device 604 may include one or more processors 616 and memory 618 communicatively coupled with the processor(s) 616. In the illustrated example, the vehicle 602 is an autonomous vehicle; however, the vehicle 602 could be any other type of vehicle, such as a semi-autonomous vehicle, or any other system having at least an image capture device (e.g., a camera-enabled smartphone). In some instances, the autonomous vehicle 602 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 602 may be a fully or partially autonomous vehicle having any other level or classification.

In the illustrated example, the memory 618 of the vehicle computing device 604 stores a localization component 620, a perception component 622, a prediction component 626, a planner component 628, one or more system controllers 632, and one or more maps 630 (or map data). Though depicted in FIG. 6 as residing in the memory 618 for illustrative purposes, it is contemplated that the localization component 620, the perception component 622, the prediction component 626, the planner component 628, system controller(s) 632, and/or the map(s) may additionally, or alternatively, be accessible to the vehicle 602 (e.g., stored on, or otherwise accessible by, memory remote from the vehicle 602, such as, for example, on memory 640 of one or more computing device 636 (e.g., a remote computing device)). In some examples, the memory 640 may include a reference line generating component 642, a lane boundary generating component 644, a lane boundary/reference line associating component 646, a cluster determining component 648, and/or a lane boundary fusing component 624.

In at least one example, the localization component 620 may include functionality to receive sensor data from the sensor system(s) 606 to determine a position and/or orientation of the vehicle 602 (e.g., one or more of an x-, y-, z-position, roll, pitch, or yaw). For example, the localization component 620 may include and/or request/receive a map of an environment, such as from map(s) 630, and may continuously determine a location and/or orientation of the vehicle 602 within the environment. In some instances, the localization component 620 may utilize SLAM (simultaneous localization and mapping), CLAMS (calibration, localization and mapping, simultaneously), relative SLAM, bundle adjustment, non-linear least squares optimization, or the like to receive image data, lidar data, radar data, inertial measurement unit (IMU) data, GPS data, wheel encoder data, and the like to accurately determine a location of the vehicle 602. In some instances, the localization component 620 may provide data to various components of the vehicle 602 to determine an initial position of the vehicle 602 for determining the relevance of an object to the vehicle 602, as discussed herein.

In some instances, the perception component 622 may include functionality to perform object detection, segmentation, and/or classification. In some examples, the perception component 622 may provide processed sensor data that indicates a presence of an object (e.g., entity) that is proximate to the vehicle 602 and/or a classification of the object as an object type (e.g., car, pedestrian, cyclist, animal, building, tree, road surface, curb, sidewalk, unknown, etc.). In some examples, the perception component 622 may provide processed sensor data that indicates a presence of a stationary entity that is proximate to the vehicle 602 and/or a classification of the stationary entity as a type (e.g., building, tree, road surface, curb, sidewalk, unknown, etc.). In additional or alternative examples, the perception component 622 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The prediction component 626 may generate one or more probability maps representing prediction probabilities of possible locations of one or more objects in an environment. For example, the prediction component 626 may generate one or more probability maps for vehicles, pedestrians, animals, and the like within a threshold distance from the vehicle 602. In some instances, the prediction component 626 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

In some examples, the prediction component 626 may generate predicted trajectories of objects (e.g., objects) in an environment. For example, the prediction component 626 may generate one or more predicted trajectories for objects within a threshold distance from the vehicle 602. In some examples, the prediction component 626 may measure a trace of an object and generate a trajectory for the object based on observed and predicted behavior.

In general, the planner component 628 may determine a path for the vehicle 602 to follow to traverse through an environment. For example, the planner component 628 may determine various routes and trajectories and various levels of detail. For example, the planner component 628 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planner component 628 may generate an instruction for guiding the vehicle 602 along at least a portion of the route from the first location to the second location. In at least one example, the planner component 628 may determine how to guide the vehicle 602 from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle. In various examples, the planner component 628 may select a trajectory for the vehicle 602.

In other examples, the planner component 628 may alternatively, or additionally, use data from the localization component 620, the perception component 622, and/or the prediction component 626 to determine a path for the vehicle 602 to follow to traverse through an environment. For example, the planner component 628 may receive data (e.g., object data) from the localization component 620, the perception component 622, and/or the prediction component 626 regarding objects associated with an environment. In some examples, the planner component 628 receives data for relevant objects within the environment. Using this data, the planner component 628 may determine a route to travel from a first location (e.g., a current location) to a second location (e.g., a target location) to avoid objects in an environment. In at least some examples, such a planner component 628 may determine there is no such collision-free path and, in turn, provide a path that brings vehicle 602 to a safe stop avoiding all collisions and/or otherwise mitigating damage.

In at least one example, the vehicle computing device 604 may include one or more system controllers 632, which may be configured to control steering, propulsion, braking, safety, emitters, communication, and other systems of the vehicle 602. The system controller(s) 632 may communicate with and/or control corresponding systems of the drive system(s) 614 and/or other components of the vehicle 602.

The memory 618 may further include one or more maps 630 that may be used by the vehicle 602 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 602 may be controlled based at least in part on the map(s) 630. That is, the map(s) 630 may be used in connection with the localization component 620, the perception component 622, the prediction component 626, and/or the planner component 628 to determine a location of the vehicle 602, detect objects in an environment, generate routes, determine actions and/or trajectories to navigate within an environment.

In some examples, the one or more maps 630 may be stored on a remote computing device(s) (such as the computing device(s) 636) accessible via network(s) 634. In some examples, multiple maps 630 may be stored based on, for example, a characteristic (e.g., type of entity, time of day, day of week, season of the year, etc.). Storing multiple maps 630 may have similar memory requirements, but increase the speed at which data in a map may be accessed. The map(s) 630 may perform any of the techniques described with respect to any of FIGS. 1-5 above with respect to generating map data that includes accurate and/or fused lane boundaries.

In some instances, aspects of some or all of the components discussed herein may include any models, techniques, and/or machine-learned techniques. For example, in some instances, the components in the memory 618 (and the memory 640, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet-50, ResNet-101, VGG, DenseNet, PointNet, Xception, ConvNeXt, and the like; visual transformer(s) (ViT(s)), such as a bidirectional encoder from image transformers (BEIT), visual bidirectional encoder from transformers (VisualBERT), image generative pre-trained transformer (Image GPT), data-efficient image transformers (DeiT), deeper vision transformer (DeepViT), convolutional vision transformer (CvT), detection transformer (DETR), Miti-DETR, or the like; and/or general or natural language processing transformers, such as BERT, GPT, GPT-2, GPT-3, or the like. In some examples, the ML model discussed herein may comprise PointPillars, SECOND, top-down feature layers (e.g., see U.S. patent application Ser. No. 15/963,833, which is incorporated by reference in its entirety herein for all purposes), and/or VoxelNet. Architecture latency optimizations may include MobilenetV2, Shufflenet, Channelnet, Peleenet, and/or the like. The ML model may comprise a residual block such as Pixor, in some examples.

In at least one example, the sensor system(s) 606 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 606 may include multiple instances of each of these or other types of sensors. For instance, the lidar sensors may include individual lidar sensors located at the corners, front, back, sides, and/or top of the vehicle 602. As another example, the camera sensors may include multiple cameras disposed at various locations about the exterior and/or interior of the vehicle 602. The sensor system(s) 606 may provide input to the vehicle computing device 604. Additionally, or in the alternative, the sensor system(s) 606 may send sensor data, via the one or more networks 634, to the one or more computing device(s) 636 at a particular frequency, after a lapse of a predetermined period of time, in near real-time, etc.

The vehicle 602 may also include one or more emitters 608 for emitting light and/or sound. The emitter(s) 608 may include interior audio and visual emitters to communicate with passengers of the vehicle 602. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 608 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 602 may also include one or more communication connections 610 that enable communication between the vehicle 602 and one or more other local or remote computing device(s). For instance, the communication connection(s) 610 may facilitate communication with other local computing device(s) on the vehicle 602 and/or the drive system(s) 614. Also, the communication connection(s) 610 may allow the vehicle to communicate with other nearby computing device(s) (e.g., computing device 636, other nearby vehicles, etc.) and/or one or more remote sensor system(s) for receiving sensor data. The communications connection(s) 610 also enable the vehicle 602 to communicate with a remote teleoperations computing device or other remote services.

The communications connection(s) 610 may include physical and/or logical interfaces for connecting the vehicle computing device 604 to another computing device or a network, such as network(s) 634. For example, the communications connection(s) 610 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 602 may include one or more drive systems 614. In some examples, the vehicle 602 may have a single drive system 614. In at least one example, if the vehicle 602 has multiple drive systems 614, individual drive systems 614 may be positioned on opposite ends of the vehicle 602 (e.g., the front and the rear, etc.). In at least one example, the drive system(s) 614 may include one or more sensor systems to detect conditions of the drive system(s) 614 and/or the surroundings of the vehicle 602. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 614. In some cases, the sensor system(s) on the drive system(s) 614 may overlap or supplement corresponding systems of the vehicle 602 (e.g., sensor system(s) 606).

The drive system(s) 614 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 614. Furthermore, the drive system(s) 614 may also include one or more communication connection(s) that enable communication by the respective drive module with one or more other local or remote computing device(s).

In at least one example, the direct connection 612 may provide a physical interface to couple the one or more drive system(s) 614 with the body of the vehicle 602. For example, the direct connection 612 may allow the transfer of energy, fluids, air, data, etc. between the drive system(s) 614 and the vehicle. In some instances, the direct connection 612 may further releasably secure the drive system(s) 614 to the body of the vehicle 602.

In at least one example, the localization component 620, the perception component 622, the prediction component 626, the planner component 628, the one or more system controllers 632, and the one or more maps 630 may process sensor data, as described above, and may send their respective outputs, over the one or more network(s) 634, to the computing device(s) 636. In at least one example, the localization component 620, the perception component 622, the prediction component 626, the planner component 628, the one or more system controllers 632, and the one or more maps 630 may send their respective outputs to the computing device(s) 636 at a particular frequency, after a lapse of a predetermined period of time, in near real-time, etc.

In some examples, the vehicle 602 may send sensor data to the computing device(s) 636 via the network(s) 634. In some examples, the vehicle 602 may receive sensor data from the computing device(s) 636 and/or remote sensor system(s) via the network(s) 634. The sensor data may include raw sensor data and/or processed sensor data and/or representations of sensor data. In some examples, the sensor data (raw or processed) may be sent and/or received as one or more log files.

The computing device(s) 636 may include processor(s) 638 and a memory 640, which may include a reference line generating component 642, a lane boundary generating component 644, a lane boundary/reference line associating component 646, a cluster determining component 648, and/or a lane boundary fusing component 624. In some examples, the memory 640 may store one or more of components that are similar to the component(s) stored in the memory 618 of the vehicle 602. In such examples, the computing device(s) 636 may be configured to perform one or more of the processes described herein with respect to the vehicle 602. In some examples, the reference line generating component 642, the lane boundary generating component 644, the lane boundary/reference line associating component 646, the cluster determining component 648, and/or the lane boundary fusing component 624 may perform substantially similar functions as the map(s) 630.

The processor(s) 616 of the vehicle 602 and the processor (s) 638 of the computing device(s) 636 may be any suitable processor capable of executing instructions to process data and perform operations as described herein. By way of example and not limitation, the processor(s) may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 618 and memory 640 are examples of non-transitory computer-readable media. The memory 618 and memory 640 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 6 is illustrated as a distributed system, in alternative examples, components of the vehicle 602 may be associated with the computing device(s) 636 and/or components of the computing device(s) 636 may be associated with the vehicle 602. That is, the vehicle 602 may perform one or more of the functions associated with the computing device(s) 636, and vice versa.

The methods described herein represent sequences of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. In some examples, one or more operations of the method may be omitted entirely. For instance, the operations may include determining a first action and a second action by the vehicle relative to a selected trajectory without determining a respective cost for one or more of the actions by the vehicle. Moreover, the methods described herein may be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Figure 7:
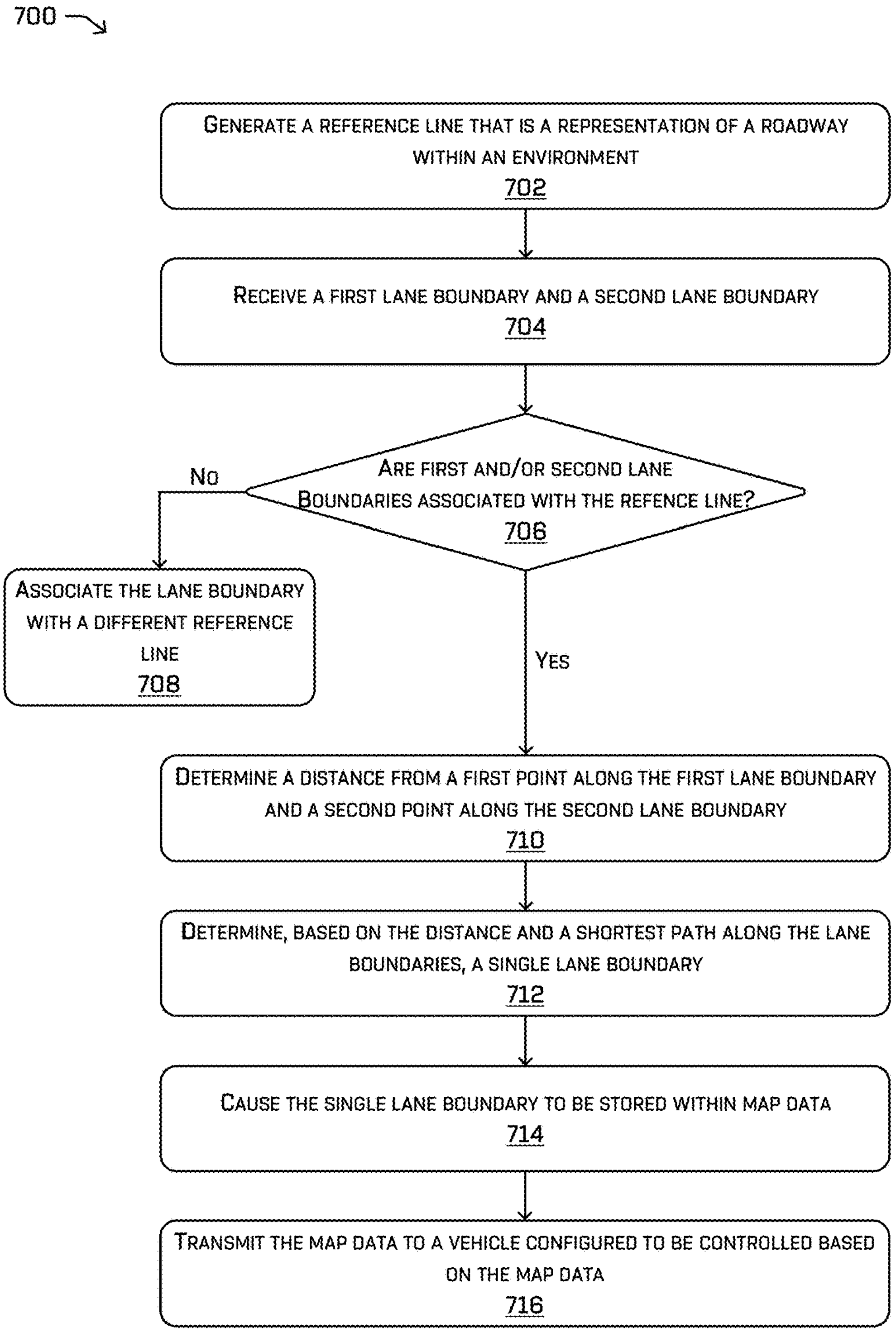
FIG. 7 is a flow diagram illustrating an example process for receiving lane boundaries, generating one or more reference lines, associating the lane boundaries with the reference line(s), fusing the lane boundaries of a reference line into a single lane boundary, and generating map data based on the single lane boundary, in accordance with one or more examples of the disclosure.

FIG. 7 is a flow diagram illustrating an example process for receiving lane boundaries, generating a reference line, associating the lane boundaries with the reference lines, fusing the lane boundaries of a reference line into a single lane boundary, generating map data based on the single lane boundary. As described below, the example process 700 may be performed by one or more computer-based components configured to implement various functionalities described herein. For instance, process 700 may be performed by a map management component. As described above, the map management component may be integrated as an on-vehicle system in some examples. However, in other examples, the map management component may be integrated as a separate server-based system.

Process 700 is illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

At operation 702, the vehicle may generate a reference line that is a representation of a roadway within an environment. That is, the reference line may include node(s) (or point(s)) at each junction and edge(s) that connect the nodes. Further, the edges may follow a center portion of the roadway between two nodes. The map management component may determine the reference line by receiving third party data (e.g., city maps, organization maps, etc.), log data, etc. Based on receiving such data, the map management component may input such data into a machine-learned model trained to output reference lines that define the road network of an environment. The reference line(s) may include one or more types of data such as location data (e.g., location of a point along the reference line), heading data (e.g., heading of the reference line or a point along the reference line), etc.

At operation 704, the vehicle may receive a first lane boundary and a second lane boundary. In some examples, the map management component may determine lane boundaries based on inputting image data into machine-learned model(s) trained to output detected lane boundaries. The lane boundary may be an edge (or boundary) of a driving lane that is depicted to the environment as a lane marking. In some examples, a vehicle may include one or more image capturing devices. Such device(s) may be configured to capture image data of the environment from unique perspectives. Further, the image data may correspond to a specific region or section of the environment. In some cases, the regions may be distinct from one another while in other examples the regions may include at least a portion of overlap. The image data may include lane boundaries of the driving lanes upon which the vehicle navigates.

Based on receiving such image data, the map management component may input the image data into a machine-learning model trained to output lane boundaries. That is, the map management component may input the image data from each region into the machine-learning model. In some cases, the machine-learning model may output contiguous lane boundaries for the region. The lane boundary output by the machine-learning model may correspond to a real-world lane boundary.

At operation 706, the vehicle may determine whether the first and/or second lane boundaries are associated with the reference line. That is, upon receiving the lane boundaries, it may be important to determine which reference line each lane boundary corresponds to. As such, the map management component may assign a lane boundary to a reference line based on a cost. The cost may include one or more sub-costs such as a distance-based cost and/or a heading-based cost. In some cases, the map management component may determine the distance-based sub-cost by determining a distance from the closest point of the lane boundary to the reference line. The distance may be used to determine the distance-based cost in which a high cost corresponds to a large distance and a low cost corresponds a small distance. In this example, a low cost may correspond to a higher likelihood of association. Further, the map management component may determine the heading-based sub-cost by determining a difference in heading between the lane boundary and the reference line. The difference in heading may be used to determine the heading-based sub-cost in which a high cost corresponds to a large difference in heading and a low cost corresponds to a small difference in heading. In some examples, the map management component may determine a combined cost by combining the distance-based sub-cost with the heading-based sub-cost. In some cases, the map management component may determine a combined cost between each lane boundary and reference line. As such, the map management component may assign (or associate) a lane boundary to a reference line based on the combined cost being the lowest of the multiple combined costs. Accordingly, if the first and/or second lane boundary are not associated with the reference line (706: No), the map management component may associate the first and/or second lane boundaries with a different reference line. That is, at operation 708, the vehicle may associate the first and/or second lane boundary with a different reference line.

In contrast, if the first and/or second lane boundaries are associated with the reference line (706: Yes), the map management component may proceed to fuse the lane boundaries. That is, at operation 710, the vehicle may determine a distance from a first point along the first lane boundary and a second point along the second lane boundary. That is, the map management component can refine (or fuse) the lane boundaries together to create a single, contiguous lane boundary. In some examples, the map management component may perform the fusing operations using a point-to-point technique or a lane boundary segment technique.

For example, when fusing two lane boundaries, the map management component may place points (or nodes) along each of the lane boundaries. The points may be spaced at a predetermined distance (e.g., one meter, five meters, 15 meters, etc.). Further, the map management component may place a point at the start of each lane boundary (e.g., starting point) and a point at the end of each lane boundary (e.g., ending point). For each point, the map management component may connect the point to other points (on the same or different lane boundary) that are within a threshold distance. That is, if the threshold is 10 meters, the map management component may connect a point to all other points on the same or different lane boundary that are within 10 meters of the point. However, the map management component may not connect points if the distance between the points meets or exceeds 10 meters. Accordingly, a single point may be connected to multiple other points.

Additionally or alternatively, the map management component may fuse the lane boundaries based on segments of the lane boundaries. For example, the map management component may place a point at the beginning and end of each lane boundary. Further, the map management component may determine (or identify) the closest points between the first lane boundary and the second lane boundary. That is, the map management component may identify a first location along the first lane boundary and a second location along the second lane boundary that results in the shortest distance between the two lane boundaries. In some cases, the map management component may place a point at the first location and a point at the second location and create an edge that extends between the first and second points.

At operation 712, the vehicle may determine, based on the distance and a shortest path along the land boundaries, a single lane boundary. Based on connecting points between lane boundaries, the map management component may determine a single lane boundary by determining a shortest path along the lane boundaries. That is, the map management component may use the reference line as a reference that spans from a starting point to an ending point. In such cases, the map management component may project the lane boundary points onto the reference line and identify the shortest path between each point from the start of the reference line to the end of the reference line. Additionally or alternatively, the map management component may determine a single lane boundary by determining a shortest path along the lane boundaries. However, in this case, the map management component may iterate the fusing process such that upon fusing two lane boundaries, the map management component may proceed to perform such operations again on the remaining unfused lane boundary segments.

At operation 714, the vehicle may cause the single lane boundary to be stored within map data. Based on fusing the lane boundaries, the map management component may generate map data that includes the single lane boundary. That is, the map management component may cause the single, contiguous lane boundary to be used and/or stored within the map data.

At operation 716, the vehicle may transmit the map data to a vehicle configured to be controlled based on the map data. Further, the map management component may send the map data to one or more real-world vehicles that are configured to use the map data and/or the lane boundaries included therein when navigating the environment.

Example Clauses

A: A system comprising: one or more processors; and one or more non-transitory computer-readable media storing computer-executable instructions that, when executed, cause the system to perform operations comprising: generating a reference line that is a representation of a roadway within an environment; receiving image data of the environment; inputting the image data into a machine-learned model trained to output lane boundaries; receiving, from the machine-learned model, a first detection of a first lane boundary and a second detection of a second lane boundary; determining that the first lane boundary and the second lane boundary are associated with the reference line; determining, based at least in part on the first lane boundary and the second lane boundary being associated with the reference line, a distance from a first point along the first lane boundary and a second point along the second lane boundary; determining, as a single lane boundary and based at least in part on the distance, a shortest path passing through the first lane boundary and second lane boundary; causing the single lane boundary to be stored within map data; and transmitting the map data to a vehicle configured to be controlled based at least in part on the map data.

B: The system of paragraph A, wherein determining that the first lane boundary is associated with the reference line comprises: determining, based at least in part on a second distance from a third point of the first lane boundary to the reference line, a distance cost; determining, based at least in part on a heading of the first lane boundary and a heading of the reference line, a heading cost; and determining, based at least in part on one or more of the distance cost or the heading cost, to associate the first lane boundary with the reference line.

C: The system of paragraph A, the operations further comprising: determining, based at least in part on the first lane boundary and the second lane boundary being associated with the reference line, a cluster that includes the first lane boundary and the second lane boundary.

D: The system of paragraph A, the operations further comprising: generating, based at least in part on the single lane boundary, a polygon; detecting that a portion of the first lane boundary is within the polygon; and causing, based at least in part on the portion being within the polygon, the portion to be excluded from the map data.

E: The system of paragraph A, wherein the reference line is a first reference line, and wherein determining that the first lane boundary is associated with the first reference line comprises: determining a first cost between the first lane boundary and the first reference line; determining a second cost between the first lane boundary and a second reference line; and determining, based at least in part on the first cost being less than the second cost, that the first lane boundary is associated with the first reference line.

F: One or more non-transitory computer-readable media storing instructions executable by one or more processors, wherein the instructions, when executed, cause a system to perform operations comprising: generating a reference line that associated with a roadway within an environment; receiving a first lane boundary and a second lane boundary; determining that the first lane boundary and the second lane boundary are associated with the reference line; determining a distance from a first point along the first lane boundary and a second point along the second lane boundary; determining a first point of the first lane boundary associated with a projection onto the reference line having a minimum arclength; determining a second point of the second lane boundary associated with a second projection onto the reference line having a maximum arclength; determining, as a single lane boundary and based at least in part on the first lane boundary, the second lane boundary, and the distance, a shortest path passing between the first point and second point; and causing the single lane boundary to be stored within map data, wherein the map data is accessible by a vehicle configured to be controlled based at least in part on the map data.

G: The one or more non-transitory computer-readable media of paragraph F, wherein determining that the first lane boundary is associated with the reference line comprises: determining, based at least in part on a second distance from a third point of the first lane boundary to the reference line, a distance cost; determining, based at least in part on a heading of the first lane boundary and a heading of the reference line, a heading cost; and determining, based at least in part on one or more of the distance cost or the heading cost, that the first lane boundary is associated with the reference line.

H: The one or more non-transitory computer-readable media of paragraph F, the operations further comprising:

determining, based at least in part on the first lane boundary and the second lane boundary being associated with the reference line, a cluster that includes the first lane boundary and the second lane boundary, wherein determining the single lane boundary is based at least in part on the first lane boundary and the second lane boundary being in the cluster.

I: The one or more non-transitory computer-readable media of paragraph F, the operations further comprising: determining that a portion of the first lane boundary is within a threshold distance of the single lane boundary; and causing, based at least in part on the portion being within the threshold distance, the portion to be excluded from the map data.

J: The one or more non-transitory computer-readable media of paragraph F, wherein the reference line is a first reference line, and wherein determining that the first lane boundary is associated with the first reference line comprises: determining a first cost between the first lane boundary and the first reference line; determining a second cost between the first lane boundary and a second reference line; and determining, based at least in part on the first cost being less than the second cost, that the first lane boundary is associated with the first reference line.

K: The one or more non-transitory computer-readable media of paragraph F, wherein determining the single lane boundary further comprises: determining a first set of points associated with the first lane boundary; determining a second set of points associated with the second lane boundary; and determining, as the single lane boundary, a shortest path between a set of points comprising the first set of points and the second set of points.

L: The one or more non-transitory computer-readable media of paragraph F, wherein generating the reference line is based at least in part on at least one of: third party data, log data, user input data, or sensor data.

M: The one or more non-transitory computer-readable media of paragraph F, wherein the first lane boundary and the second lane boundary are received based at least in part on: receiving image data of the environment; inputting the image data into a machine-learned model trained to output lane boundaries; and receiving, from the machine-learned model, a first detection of the first lane boundary and a second detection of the second lane boundary.

N: A method comprising: generating a reference line that associated with a roadway within an environment; receiving a first lane boundary and a second lane boundary; determining that the first lane boundary and the second lane boundary are associated with the reference line; determining a distance from a first point along the first lane boundary and a second point along the second lane boundary; determining a first point of the first lane boundary associated with a projection onto the reference line having a minimum arclength; determining a second point of the second lane boundary associated with a second projection onto the reference line having a maximum arclength; determining, as a single lane boundary and based at least in part on the first lane boundary, second lane boundary, and the distance, a shortest path passing between the first point and second point; and causing the single lane boundary to be stored within map data, wherein the map data is accessible by a vehicle configured to be controlled based at least in part on the map data.

O: The method of paragraph N, wherein determining that the first lane boundary is associated with the reference line comprises: determining, based at least in part on a second distance from a third point of the first lane boundary to the reference line, a distance cost; determining, based at least in part on a heading of the first lane boundary and a heading of the reference line, a heading cost; and determining, based at least in part on one or more of the distance cost or the heading cost, that the first lane boundary is associated with the reference line.

P: The method of paragraph N, further comprising: determining, based at least in part on the first lane boundary and the second lane boundary being associated with the reference line, a cluster that includes the first lane boundary and the second lane boundary, wherein determining the single lane boundary is based at least in part on the first lane boundary and the second lane boundary being in the cluster.

Q: The method of paragraph N, further comprising: determining that a portion of the first lane boundary is within a threshold distance of the single lane boundary; and causing, based at least in part on the portion being within the threshold distance, the portion to be excluded from the map data.

R: The method of paragraph N, wherein the reference line is a first reference line, and wherein determining that the first lane boundary is associated with the first reference line comprises: determining a first cost between the first lane boundary and the first reference line; determining a second cost between the first lane boundary and a second reference line; and determining, based at least in part on the first cost being less than the second cost, that the first lane boundary is associated with the first reference line.

S: The method of paragraph N, wherein determining the single lane boundary further comprises: determining a first set of points associated with the first lane boundary; determining a second set of points associated with the second lane boundary; and determining, as the single lane boundary, a shortest path between a set of points comprising the first set of points and the second set of points.

T: The method of paragraph N, wherein the first lane boundary and the second lane boundary are received based at least in part on: receiving image data of the environment; inputting the image data into a machine-learned model trained to output lane boundaries; and receiving, from the machine-learned model, a first detection of the first lane boundary and a second detection of the second lane boundary.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
- one or more processors; and
- one or more non-transitory computer-readable media storing computer-executable instructions that, when executed, cause the system to perform operations comprising:
  - generating a reference line that is a representation of a roadway within an environment;
  - receiving image data of the environment;
  - inputting the image data into a machine-learned model trained to output lane boundaries;
  - receiving, from the machine-learned model, a first detection of a first lane boundary and a second detection of a second lane boundary;
  - determining that the first lane boundary and the second lane boundary are associated with the reference line;
  - determining, based at least in part on the first lane boundary and the second lane boundary being associated with the reference line, a distance from a first point along the first lane boundary and a second point along the second lane boundary;
  - determining, as a single lane boundary and based at least in part on the distance, a shortest path passing through the first lane boundary and second lane boundary;
  - causing the single lane boundary to be stored within map data; and
  - transmitting the map data to a vehicle configured to be controlled based at least in part on the map data.

2. The system of claim 1, wherein determining that the first lane boundary is associated with the reference line comprises:
- determining, based at least in part on a second distance from a third point of the first lane boundary to the reference line, a distance cost;
- determining, based at least in part on a heading of the first lane boundary and a heading of the reference line, a heading cost; and
- determining, based at least in part on one or more of the distance cost or the heading cost, to associate the first lane boundary with the reference line.

3. The system of claim 1, the operations further comprising:
- determining, based at least in part on the first lane boundary and the second lane boundary being associated with the reference line, a cluster that includes the first lane boundary and the second lane boundary.

4. The system of claim 1, the operations further comprising:
- generating, based at least in part on the single lane boundary, a polygon;
- detecting that a portion of the first lane boundary is within the polygon; and
- causing, based at least in part on the portion being within the polygon, the portion to be excluded from the map data.

5. The system of claim 1, wherein the reference line is a first reference line, and wherein determining that the first lane boundary is associated with the first reference line comprises:
- determining a first cost between the first lane boundary and the first reference line;
- determining a second cost between the first lane boundary and a second reference line; and
- determining, based at least in part on the first cost being less than the second cost, that the first lane boundary is associated with the first reference line.

6. One or more non-transitory computer-readable media storing instructions executable by one or more processors, wherein the instructions, when executed, cause a system to perform operations comprising:

generating a reference line that associated with a roadway within an environment;

receiving a first lane boundary and a second lane boundary;

determining that the first lane boundary and the second lane boundary are associated with the reference line;

determining a distance from a first point along the first lane boundary and a second point along the second lane boundary;

determining a first point of the first lane boundary associated with a projection onto the reference line having a minimum arclength;

determining a second point of the second lane boundary associated with a second projection onto the reference line having a maximum arclength;

determining, as a single lane boundary and based at least in part on the first lane boundary, the second lane boundary, and the distance, a shortest path passing between the first point and second point; and causing the single lane boundary to be stored within map data, wherein the map data is accessible by a vehicle configured to be controlled based at least in part on the map data.

7. The one or more non-transitory computer-readable media of claim 6, wherein determining that the first lane boundary is associated with the reference line comprises:

determining, based at least in part on a second distance from a third point of the first lane boundary to the reference line, a distance cost;

determining, based at least in part on a heading of the first lane boundary and a heading of the reference line, a heading cost; and determining, based at least in part on one or more of the distance cost or the heading cost, that the first lane boundary is associated with the reference line.

8. The one or more non-transitory computer-readable media of claim 6, the operations further comprising:

determining, based at least in part on the first lane boundary and the second lane boundary being associated with the reference line, a cluster that includes the first lane boundary and the second lane boundary, wherein determining the single lane boundary is based at least in part on the first lane boundary and the second lane boundary being in the cluster.

9. The one or more non-transitory computer-readable media of claim 6, the operations further comprising:

determining that a portion of the first lane boundary is within a threshold distance of the single lane boundary; and causing, based at least in part on the portion being within the threshold distance, the portion to be excluded from the map data.

10. The one or more non-transitory computer-readable media of claim 6, wherein the reference line is a first reference line, and wherein determining that the first lane boundary is associated with the first reference line comprises:

determining a first cost between the first lane boundary and the first reference line;

determining a second cost between the first lane boundary and a second reference line; and determining, based at least in part on the first cost being less than the second cost, that the first lane boundary is associated with the first reference line.

11. The one or more non-transitory computer-readable media of claim 6, wherein determining the single lane boundary further comprises:

determining a first set of points associated with the first lane boundary;

determining a second set of points associated with the second lane boundary; and determining, as the single lane boundary, a shortest path between a set of points comprising the first set of points and the second set of points.

12. The one or more non-transitory computer-readable media of claim 6, wherein generating the reference line is based at least in part on at least one of:

third party data, log data, user input data, or sensor data.

13. The one or more non-transitory computer-readable media of claim 6, wherein the first lane boundary and the second lane boundary are received based at least in part on:

receiving image data of the environment;

inputting the image data into a machine-learned model trained to output lane boundaries; and receiving, from the machine-learned model, a first detection of the first lane boundary and a second detection of the second lane boundary.

14. A method comprising:

generating a reference line that associated with a roadway within an environment;

receiving a first lane boundary and a second lane boundary;

determining that the first lane boundary and the second lane boundary are associated with the reference line;

determining a distance from a first point along the first lane boundary and a second point along the second lane boundary;

determining a first point of the first lane boundary associated with a projection onto the reference line having a minimum arclength;

determining a second point of the second lane boundary associated with a second projection onto the reference line having a maximum arclength;

determining, as a single lane boundary and based at least in part on the first lane boundary, second lane boundary, and the distance, a shortest path passing between the first point and second point; and causing the single lane boundary to be stored within map data, wherein the map data is accessible by a vehicle configured to be controlled based at least in part on the map data.

15. The method of claim 14, wherein determining that the first lane boundary is associated with the reference line comprises:

determining, based at least in part on a second distance from a third point of the first lane boundary to the reference line, a distance cost;

determining, based at least in part on a heading of the first lane boundary and a heading of the reference line, a heading cost; and determining, based at least in part on one or more of the distance cost or the heading cost, that the first lane boundary is associated with the reference line.

16. The method of claim 14, further comprising:

determining, based at least in part on the first lane boundary and the second lane boundary being associated with the reference line, a cluster that includes the first lane boundary and the second lane boundary, wherein determining the single lane boundary is based at least in part on the first lane boundary and the second lane boundary being in the cluster.

17. The method of claim 14, further comprising:

determining that a portion of the first lane boundary is within a threshold distance of the single lane boundary; and causing, based at least in part on the portion being within the threshold distance, the portion to be excluded from the map data.

18. The method of claim 14, wherein the reference line is a first reference line, and wherein determining that the first lane boundary is associated with the first reference line comprises:

determining a first cost between the first lane boundary and the first reference line;

determining a second cost between the first lane boundary and a second reference line; and determining, based at least in part on the first cost being less than the second cost, that the first lane boundary is associated with the first reference line.

19. The method of claim 14, wherein determining the single lane boundary further comprises:

determining a first set of points associated with the first lane boundary;

determining a second set of points associated with the second lane boundary; and determining, as the single lane boundary, a shortest path between a set of points comprising the first set of points and the second set of points.

20. The method of claim 14, wherein the first lane boundary and the second lane boundary are received based at least in part on:

receiving image data of the environment;

inputting the image data into a machine-learned model trained to output lane boundaries; and receiving, from the machine-learned model, a first detection of the first lane boundary and a second detection of the second lane boundary.

* * * * *